Nov. 24, 1970  R. B. PHARIS  3,541,881
ADJUSTABLE PEDAL
Filed Nov. 18, 1968  3 Sheets-Sheet 1
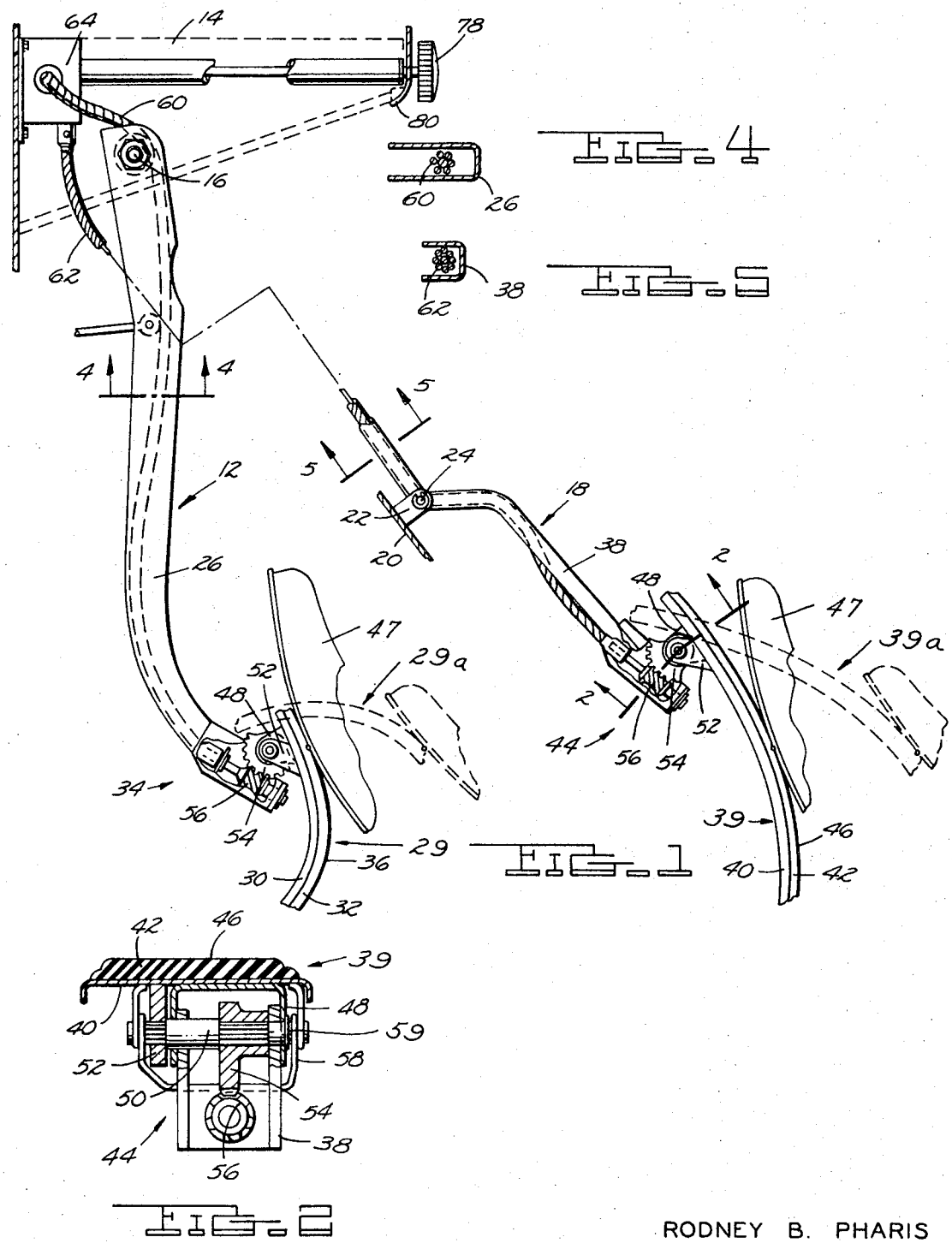
RODNEY B. PHARIS
*INVENTOR.*
BY John R. Faulkner
Roger E. Erickson
ATTORNEYS

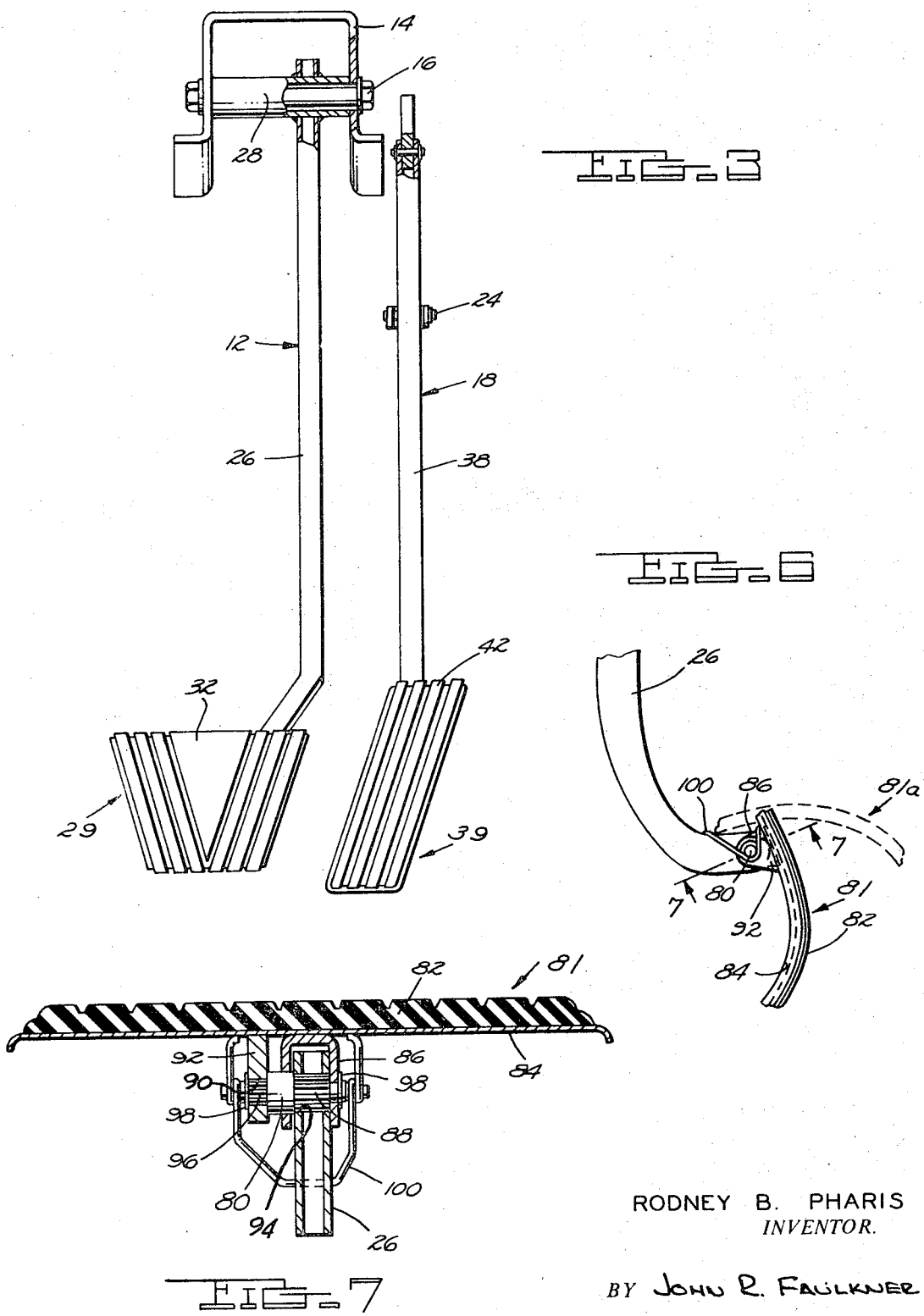

RODNEY B. PHARIS
INVENTOR

BY John R. Faulkner

Roger E. Erickson

ATTORNEYS

United States Patent Office 3,541,881
Patented Nov. 24, 1970

3,541,881
ADJUSTABLE PEDAL
Rodney B. Pharis, San Jose, Calif., assignor to Ford Motor Company, Dearborn, Mich., a corporation of Delaware
Filed Nov. 18, 1968, Ser. No. 776,452
Int. Cl. G05g 1/04
U.S. Cl. 74—512                                    15 Claims

ABSTRACT OF THE DISCLOSURE

A pedal assembly for an automotive vehicle having an adjustable contoured pad. The pad is rotatable relative to the pedal lever about an axis parallel to the pivot axis of the pedal lever to vary the fore and aft distance between the pedal and the vehicle operator seat. The contour of the pad provides substantial pad contact with the sole of the operator's shoe during all positions of adjustment.

BACKGROUND OF THE INVENTION

In a conventional automotive vehicle, pedals are provided for controlling brakes and engine throttle. If the vehicle has a manual transmission, a clutch pedal is also provided. These pedal controls are foot operated by the driver. In order for the driver to obtain the most advantageous position for working these controls, the vehicle front seat is usually slidably mounted on a seat track with means for retaining the seat along the track in a number of set positions.

The adjustment provided by moving the seat along the seat track does not accommodate all vehicle operators due to differences in anatomical dimensions. Therefore, the present invention provides an improvemenut over conventional vehicles by providing pedal controls that are adjustable so that the driver may select the spacing between the seat, the steering wheel, and the pedals which will best accommodate the dimensions of his legs and arms.

This invention provides an adjustable pedal mechanism wherein contoured pedal pad is rotatable relative to the pedal lever to act as a cam to vary the fore and aft distance between the pedal and the vehicle operator seat. It also provides an adjustable pedal mechanism in which the pedal lever is not moved during pedal adjustment and in which the pivot axis of the pedal lever remains fixed for all positions of pedal adjustment.

The invention further provides an adjustable pedal mechanism in which the basic designs of conventional pedal levers need not be significantly changed. Another feature of the invention is that the pedals may be adjusted either automatically or manually. The pedal adjustment actuating mechanism is conveniently located on the dash of the vehicle.

The invention further provides a mechanism in which the various pedals of the vehicle may be adjusted independently of one another.

BRIEF SUMMARY OF THE INVENTION

An adjustable pedal mechanism of an automotive vehicle constructed in accordance with this invention includes a lever means pivotally mounted to the body portion of the automotive vehicle, a pedal pad assembly pivotally mounted to one end of the lever means and adjustment means to selectively position the pedal pad assembly relative to the lever means. The pedal pad assembly has a convexly contoured face which is engagable with the vehicle operator's shoe.

BRIEF DESCRIPTION OF THE DRAWINGS

FIG. 1 is a side elevational view of an adjustable pedal mechanism embodying the invention;
FIG. 2 is a section taken along lines 2—2 of FIG. 1;
FIG. 3 is a front elevational view of the adjustable pedal mechanism with portions broken away viewing the brake pedal and the accelerator pedal in a direction from the rear of the vehicle toward the front;
FIG. 4 is a cross section of the lever arm taken along lines 4—4 of FIG. 1;
FIG. 5 is a cross section of the accelerator lever taken along lines 5—5 of FIG. 1;
FIG. 6 is a side elevtational view of an alternate embodiment of the invention;
FIG. 7 is a cross section taken along lines 7—7 of FIG. 6.

DETAILED DESCRIPTION OF A PREFERRED EMBODIMENT

Figure 8:
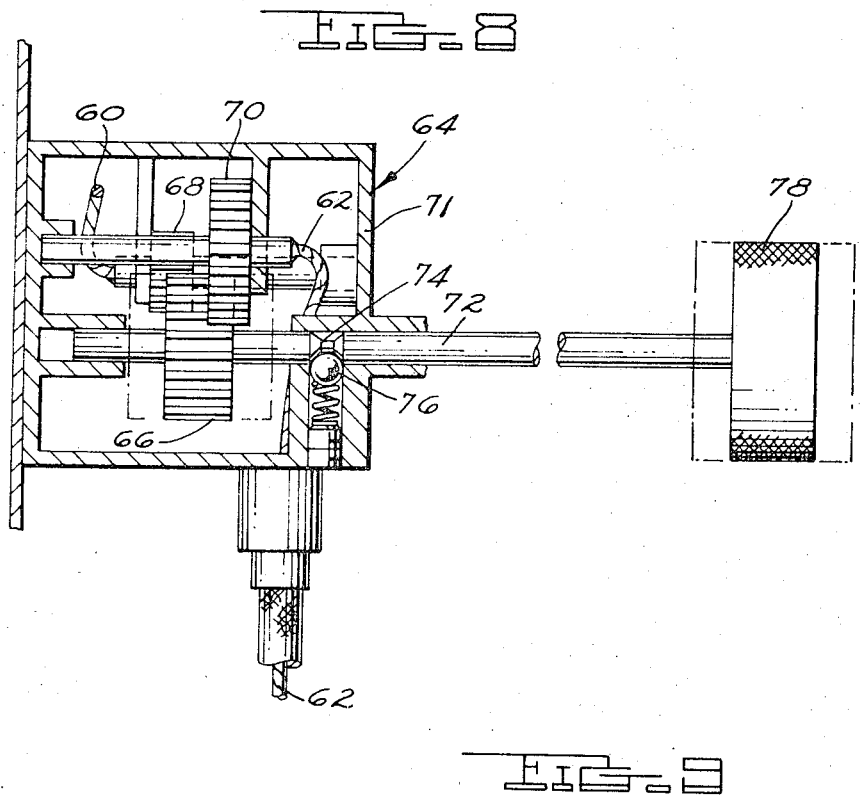
FIG. 8 is a cross sectional view of the gear adjustment unit 64.

In the drawings, FIG.1, 2 and3 illustrate generally an adjustable pedal assembly embodying the invention. A brake pedal 12 is pivotally connected to an under-dash support member 14 by bolt 16. An accelerator pedal 18 is pivotally connected to the vehicle floor pan 20 by bracket 22 and pin 24.

The brake pedal 12 comprises a channel-shaped lever 26, a tubular portion 28 rigidly secured to the upper end of lever 26, a pedal pad assembly 29 and a mechanism 34 designed to permit assembly 29 to pivot relative to lever 26 about an axis parallel to the pivot axis of lever 26. Assembly 29 comprises a metal backing plate 30, a rubber foot pad 32 and a U-shaped bracket 48 secured to the backing plate. Bolt 16 extends through the support member 14 and tubular portion 28. The pad 32 has a convexly contoured face 36 which contacts the vehicle operator's foot.

The accelerator pedal 18 comprises a channel-shaped lever 38, a pedal pad assembly 39 and a mechanism 44 designed to permit assembly 39 to pivot relative to lever 38 about a horizontal axis perpendicular to the lever 38. Assembly 39 comprises a metal backing plate 40, a rubber foot pad 42 and a U-shaped bracket 48 secured to the backing plate. The pad 42, like pad 32, has a convexly contoured face 46 which contacts the operator's foot.

The contours of pedal pad faces 36 and 46 have continuously decreasing radii from the upper peripheries of the pedal pads to the lower peripheries. This permits the vehicle operator's shoe 47 to engage the face 36 or 46 tangentially rather than along an edge of one of the pedal pad faces. Numerals 29a and 39a refer to pedal pad assemblies 29 and 39, respectively, in positions of extreme adjustment. The pivot axes of the pedal pad assemblies 29 and 39 relative to the pedal levers 26 and 38, respectively, are located adjacent the upper peripheries of the pad assemblies.

Brake pedal adjustment mechanism 34 and accelerator pedal adjustment mechanism 44 are structurally and functionally similar. Therefore, only mechanism 44, illustrated in FIGS. 1 and 2, is described. U-shaped bracket 48 is rigidly secured to pedal backing plate 40 and has two coaxial holes formed in its legs. A corresponding pair of coaxial holes are formed in the lower end of lever 38. The two pairs of coaxial holes are aligned and a pin 50 is received therein to pivotally connect lever 38 and pad assembly 39. Splined to pin 50 are stop member 52 and worm gear 54. Stop member 52 permits the pedal pad backing plate 40 to swing upwardly should the lower edge of the backing plate "bottom" against the floor pan. Engaging worm gear 54 and rotatably attached to lever 38 is a worm 56 having an axis perpendicular to that of worm gear 54. A spring 58 is mounted to the ends of pin 50 and biases the pedal pad assembly 39 clockwise according to FIG. 1 against stop member 52. A clip 59 engages a groove adjacent an end of pin 50 to hold pin 50 in axial position within mechanism 44.

Figure 9:
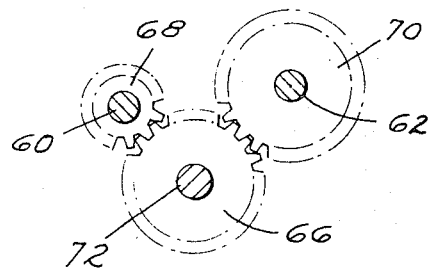
FIG. 9 is a schematic view of the gears of unit 64 in the direction of the axis of rotation of gear 66.

Flexible torque transmitting cables 60 and 62 interconnect the two worms 56 and a gear unit 64, illustrated in detail by FIGS. 8 and 9 of the drawings. A spur gear 66 drives a second spur gear 68 attached to the accelerator adjustment cable 60 and a third spur gear 70 attached to the brake adjustment cable 62. The diameter of spur gear 68 is less than that of spur gear 70 to provide greater angular displacement of pedal pad assembly 29 than of pedal assembly 39 per revolution of driver gear 66. It may be observed from FIG. 1 that because of the differences in pad length pedal pad assembly 29 must be angularly displaced a greater amount than pedal pad assembly 39 to achieve an equal linear displacement.

Driving gear 66 is axially movable within housing 71 so that gears 68 and 70 may be driven either simultaneously or individually. Shaft 72 has a groove 74 which receives spring pressed ball 76 to provide a normal axial position to shaft 72 and gear 66. A knob 78 is exposed from the dash 80 and may be hand turned by the vehicle operator to obtain pedal adjustment.

If power adjustable pedals are desired, flexible shafts 60 and 62 may be rotated by small electric motors rather than the knob and gear box combination.

The embodiment described in the preceding paragraphs is one which has a swing-away pedal feature incorporating the stop member 52. If the swing-away features were not desired, it may be seen that stop member 52 could be securely fastened to pedal backing plates 40 or 30 to provide a solid connection.

A low cost embodiment is shown by FIGS. 6 and 7 of the drawings in which the pedal pad is adjustable by removal of a stepped diameter splined pin 80. This embodiment may be used to provide a long term adjustment to extend the range of seat adjustment to accommodate the vehicle operator who has unusually long or short arms or legs. The pedal pad assembly 81 includes a metal backing portion 84 to which U-shaped bracket 86 is fastened to the backside and to which rubber pad 82 is secured to its frontside. The assembly 81 is pivotally connected to the lower end of lever 26 by pin 80. Numeral 81a refers to the pedal pad assembly 81 in a position of extreme adjustment. The pin 80 has a male splined portion 88 that mates with female splined portion 94 of lever 26. The portions of the pin 80 engaging the bracket 86 are not splined, thus permitting free movement of bracket 86 about the axis of pin 80. Stop member 92 has a splined opening 90 which receives a second, smaller diameter splined portion 96 of pin 80. When assembled the positions of pin 80 and stop member 92 are angularly fixed relative to lever 26. The pin is held axially in place by snap rings 98 which engage grooves formed in pin 80 adjacent its ends. A spring 100 is fastened to pin 80 and biases the pedal pad clockwise according to FIG. 6 into engagement with stop member 92.

OPERATION

Both of the embodiments described above provide pedal assemblies which are adjustable by angular movement of a contoured pad assembly relative to a pedal lever. In the first embodiment, illustrated in FIGS. 1 and 2, worms 56 are rotatably mounted to levers 26 and 38 and drive the worm gears 54. Each worm gear 54 rotates as a unit with a pin 50 and a stop member 52. The pedal pad assemblies 29 and 39 are biased against stop members 52 and, consequently, during adjustment the pedal pad assemblies 29 and 39 rotate amounts equal to the angular movement of their respective stop members 52. The shape of stop members 52 permits the pedal pad assemblies 29 and 39 to pivot upwardly in the event that the pedal assembly should bottom against the floor pan. Such bottoming might be caused, for example, by loss of hydraulic fluid in the brake system.

The contoured faces 36 and 46 act as cams when the pedal pads are adjusted to accommodate varying sized vehicle operators. The contours of the pedal pad faces are such that a portion of the pad face is always substantially tangential to the sole of the pedal operator's shoe 47 for any position of adjustment relative to the pedal lever.

Pad assemblies 29 and 39 may be adjusted by turning knob 78 which rotates spur gear 66 as illustrated in FIGS. 8 and 9. Rotation of knob 78 with shaft 72 in its normal position so that ball 76 engages groove 74 causes both the accelerator gear 70 and the brake gear 68 to rotate, and thus both the accelerator pad assembly 39 and the brake pad assembly 29 are adjusted. If the knob 78 is pulled out from the dashboard as it is turned, only accelerator gear 70 will be engaged by gear 66. If the knob 78 is pushed in toward the dashboard as it is turned, only brake gear 68 will be engaged by gear 66.

The worm gear assemblies 34 and 44 are of the irreversible type, i.e., a torque of the worm 56 will rotate the worm gear 54, but a torque on the gear 54 will not rotate the worm 56. This prevents the force of the vehicle operator's foot against the pedal pad from effecting undesired adjustment of the pedal pads.

The low cost embodiment, shown in FIGS. 6 and 7 of the drawings, is adjustable by removing spring 100 and clips 98, and then changing the position of stop member 92 on the splined portion 96 of pin 80.

It will be understood that this invention is not to be limited to the exact construction shown and described but that various changes and modifications may be made without departing from the spirit and scope of the invention.

I claim:

1. An adjustable pedal mechanism for an automotive vehicle comprising:
   lever means pivotally mounted to the body portion of the automotive vehicle,
   a pedal pad assembly pivotally mounted to one end of said lever means for rotation relative thereto upon adjustment of said pedal mechanism,
   said pedal pad position being fixed relative to said lever means during normal application and release of the pedal mechanism,
   said pedal pad assembly having a convexly contoured face of decreasing radii,
   adjustment means to selectively position said pedal pad assembly relative to said lever means.

2. A device according to claim 1 and including:
   said lever means being dependently mounted from the automotive vehicle body portion,
   said pedal pad being mounted to end of said lever means,
   said contoured face having a continuously decreasing radius from the upper periphery to the lower periphery of said pedal pad assembly.

3. A device according to claim 2 and including:
   said pedal pad assembly being connected to said lever means adjacent the upper periphery of said pedal pad assembly so as to be substantially dependent therefrom.

4. An adjustable pedal mechanism for an automotive vehicle comprising:
   lever means mounted pivotally to and dependently from the body portion of the automotive vehicle,
   a pedal pad assembly pivotally mounted to the depending end of said lever means, said pedal pad assembly having a convexly contoured face, said face having a continuously decreasing radius from its upper periphery to its lower periphery, adjustment means to selectively position said pedal pad assembly relative to said lever means, said adjustment means comprising a first splined opening formed in the depending end of said lever means, a second splined opening formed in a portion of said pedal pad assembly and being coaxial with said first splined opening, a splined pin received in said splined openings and determining the position of said pedal pad assembly relative to said lever means.

5. An adjustable pedal mechanism for an automotive vehicle comprising:

lever means mounted pivotally to and dependently from the body portion of the automotive vehicle, a pedal pad assembly pivotally mounted to the depending end of said lever means, said pedal pad assembly having a convexly contoured face, said face having a continuously decreasing radius from its upper periphery to its lower periphery, adjustment means to selectively position said pedal pad assembly relative to said lever means, said adjustment means comprising a first splined opening formed in the dependent end of said lever means, a stop member having a second splined opening coaxial with said first splined opening and engaging said pedal pad assembly, a splined pin received in said splined openings and determining the position of said stop member relative to said lever means, said stop member abutting said pedal pad assembly to prevent pivotal movement of said pedal pad assembly relative to said lever means in one direction and permitting such movement in the other direction.

6. A mechanism according to claim 5 and including:

spring means biasing said pedal pad assembly toward said stop member.

7. An adjustable pedal mechanism for an automotive vehicle comprising:

lever means mounted pivotally to and dependently from the body portion of the automotive vehicle, a pedal pad assembly pivotally mounted to the depending end of said lever means, said pedal pad assembly having a convexly contoured face, said face having a continuously decreasing radius from its upper periphery to its lower periphery, adjustment means to selectively position said pedal pad assembly relative to said lever means, said adjustment means comprising a pin pivotally connecting said pedal pad assembly and said lever means, stop means rigidly secured to said pin and engaging said pedal pad assembly, said stop means abutting said pedal pad assembly to prevent pivotal movement of said pedal pad assembly relative to said lever means in one direction and permitting such movement in the other direction, a worm gear rigidly secured to said pin, a worm rotatably mounted to said lever means and engaging said worm gear, means to rotate said worm whereby said worm gear and pedal pad assembly pivot relative to said lever means to provide adjustability in the distance between the contoured face of said pedal pad assembly and the vehicle operator seat.

8. An adjustable pedal mechanism for an automotive vehicle comprising:

lever means mounted pivotally to and dependently from the body portion of the automotive vehicle, a pedal pad assembly pivotally mounted to the depending end of said lever means, said pedal pad assembly having a convexly contoured face, said face having a continuously decreasing radius from its upper periphery to its lower periphery, adjustment means to selectively position said pedal pad assembly relative to said lever means, said adjustment means comprising a worm gear connected to said pedal pad assembly, a worm rotatably mounted to said lever means and engaging said worm gear, means to rotate said worm whereby said worm gear and pedal pad assembly pivot relative to said lever means to provide adjustability between the contoured face of said pedal pad assembly and the vehicle operator seat.

9. A mechanism according to claim 8 and including:

spring means biasing said pedal pad assembly toward said stop means.

10. A mechanism according to claim 8 and including:

said means to rotate said worm comprising a flexible torque transmitting shaft connected to said worm, manually operable means to rotate said flexible shaft.

11. An adjustable pedal assembly including a number of pedal mechanisms according to claim 8, each of said lever means of said pedal mechanisms having a pivotal axis parallel to that of the other said lever means, flexible torque transmitting shafts, means to rotate said flexible shafts, each of said flexible shafts interconnecting one said worm and said just mentioned means.

12. An adjustable pedal assembly according to claim 11 and including:

said means to rotate said flexible shafts comprising a driving gear, driven gears engaging said driving gear, each of said driven gears being connected to one of said flexible shafts.

13. An adjustable pedal mechanism for an automotive vehicle comprising:

lever means pivotally mounted to the body portion of the automotive vehicle, a pedal pad assembly pivotally mounted on one end of said lever means for rotation relative thereto upon adjustment of said pedal mechanism, said pedal pad position being fixed relative to said lever means during normal application and release of the pedal mechanism, said pedal pad assembly having a convexly contoured face, adjustment means to selectively position said pedal pad assembly relative to said lever means, control means remotely positioned from said pedal pad assembly and said adjustment means, means interconnecting said control means and said adjustment means, whereby the position of said pedal pad assembly is adjusted relative to said lever means upon actuation of said control means.

14. An adjustable pedal mechanism according to claim 13 and including:

said means interconnecting said control means and said adjustment means comprising a flexible shaft.

15. An adjustable pedal mechanism according to claim 13 and including:

said means interconnecting said control means and said adjustment means comprising a flexible shaft, said adjustment means comprising a worm gear mounted to said pedal pad assembly to move therewith and a worm rotatably mounted to said pedal lever means and engaging said worm gear.

(References on following page)

References Cited

UNITED STATES PATENTS

| | | | |
|---|---|---|---|
| 2,915,916 | 12/1959 | Hinsey et al. | 74—512 XR |
| 3,086,406 | 4/1963 | Voser | 74—516 XR |
| 3,151,499 | 10/1964 | Roe | 74—512 |
| 3,242,763 | 3/1966 | Buchwald | 74—512 XR |
| 3,282,125 | 11/1966 | Dully | 74—512 XR |
| 3,373,661 | 3/1968 | Reichard | 74—512 XR |

FRED C. MATTERN, JR., Primary Examiner

F. D. SHOEMAKER, Assistant Examiner